Figure 1:
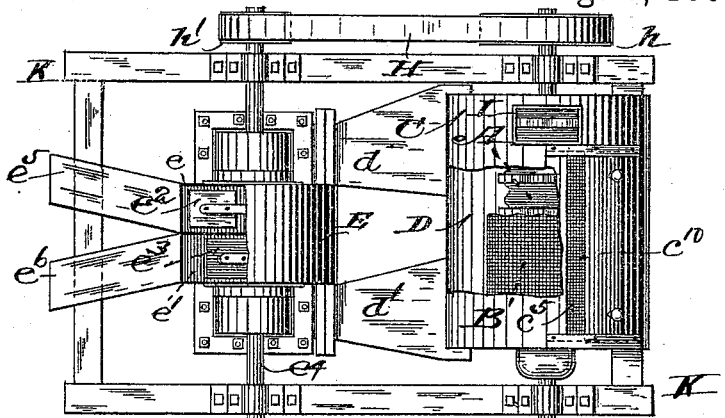

(No Model.) 3 Sheets—Sheet 1.

A. D. THOMAS.
METHOD OF AND APPARATUS FOR DELINTING COTTON SEED.

No. 503,103. Patented Aug. 8, 1893.

WITNESSES
Edward W. Furrell
A. Bonville

INVENTOR
Abner D. Thomas
by C. D. Moody (No Model.) 3 Sheets—Sheet 2.
A. D. THOMAS.
METHOD OF AND APPARATUS FOR DELINTING COTTON SEED.
No. 503,103. Patented Aug. 8, 1893.
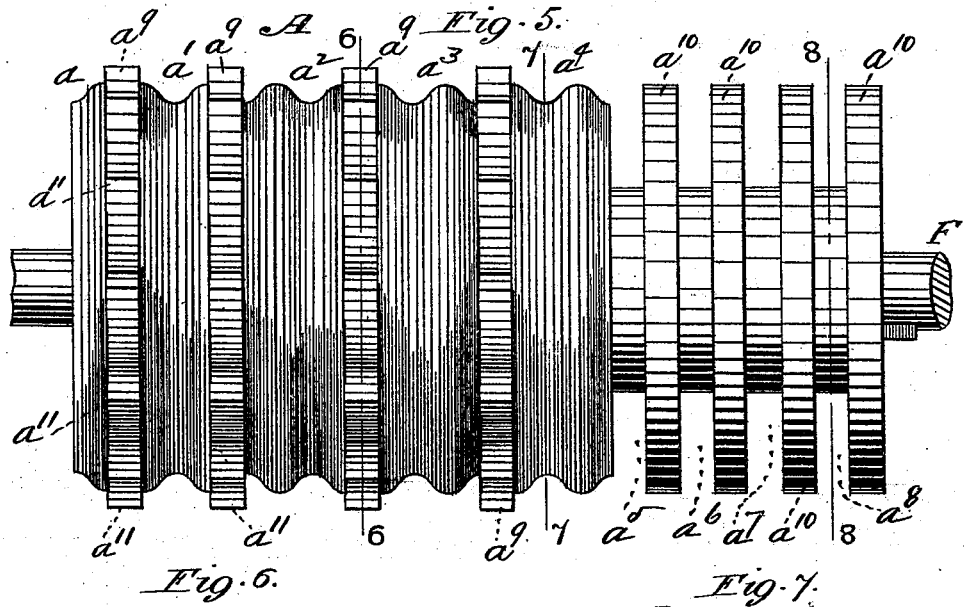
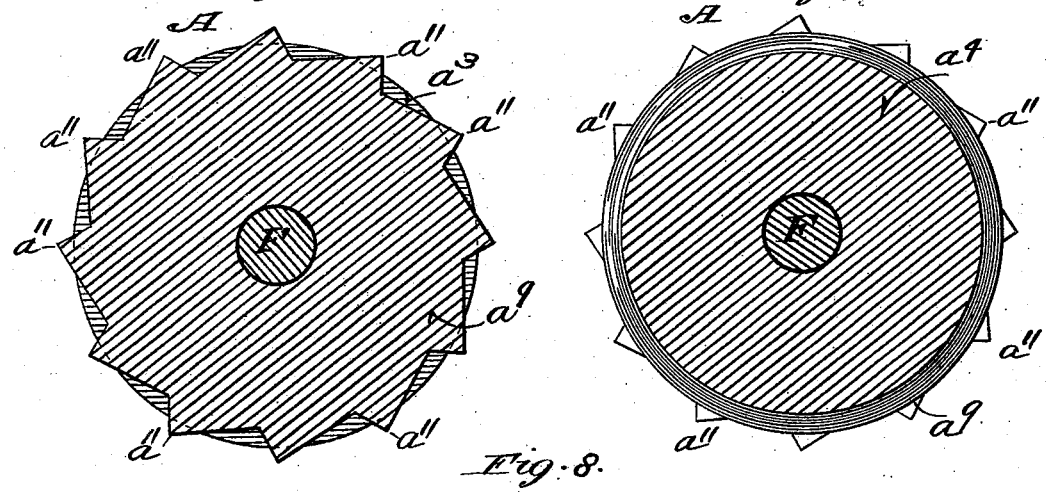
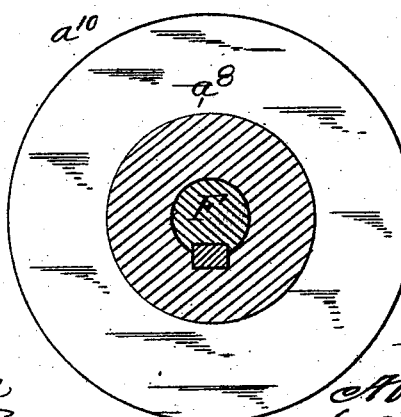
WITNESSES
Edward L. Farrell
A. Bonville
INVENTOR
Abner D. Thomas
by C. A. Moody
Atty

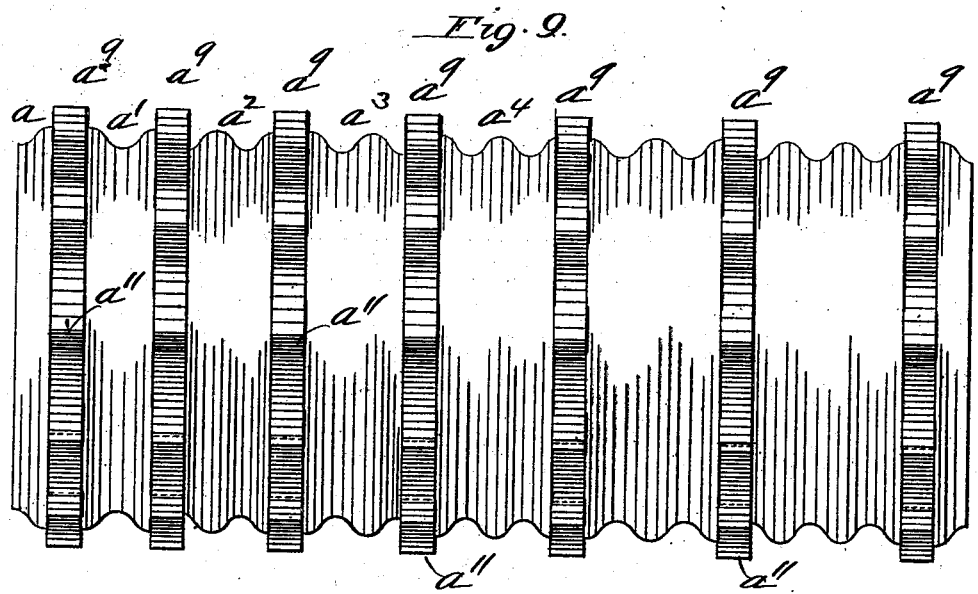

UNITED STATES PATENT OFFICE.

ABNER D. THOMAS, OF LITTLE ROCK, ARKANSAS, ASSIGNOR TO THE THOMAS MANUFACTURING COMPANY, OF SAME PLACE.

METHOD OF AND APPARATUS FOR DELINTING COTTON-SEED.

SPECIFICATION forming part of Letters Patent No. 503,103, dated August 8, 1893.

Application filed February 13, 1893. Serial No. 462,109. (No model.)

*To all whom it may concern:*

Be it known that I, ABNER D. THOMAS, of Little Rock, Arkansas, have made a new and useful Improvement in Methods of and Apparatus for Delinting Cotton-Seed, of which the following is a full, clear, and exact description.

In carrying out the improvement the lint-bearing seed is fed into a receptacle containing a lint-cutting or seed-abrading part which, in its general outline, is cylindrical or approximately cylindrical, and which is arranged horizontally and adapted to be rotated in a vertical, or approximately vertical, plane. The shell or casing which forms the wall of the seed-receptacle is not in itself intended to serve as a lint-cutting or seed-abrading part, but to form a support for the material while it is being acted upon by the rotating part, and it is shaped and arranged, and is of suitable size, to inclose an annular, or approximately annular, space around the rotating part so that the material being treated can assume an annular, or approximately annular, form around the described rotating part, and, opposite the surface of the rotating part, it is perforated to provide an outlet for the lint which is separated from the seed. There is a separate outlet for the denuded seed. The perforations in the shell or casing are large enough, and are suitably formed, to enable the lint to escape through them, but not so large that the denuded seed can pass through them. It is not essential that the perforations, as a system, extend entirely around the circumference of the shell or casing, but it is desirable for them to so extend as thereby an outlet for the lint is obtained in all directions around the body of seed being treated. An escape flue for the lint connects with the outer side of the perforated portion of the casing through which the lint discharged through the casing is carried off. The denuded seed is worked endwise within the described annular space and is discharged through the separate outlet mentioned. This outlet is usually at the end of the seed-receptacle, and it may be of any suitable form for the purpose in question, and lead to any desired quarter. In constructing the perforations which form the lint-outlet care should be taken to avoid projections, roughnesses, or anything calculated either to interfere with the movement (hereinafter referred to) of the annular body of seed, or with the escape of the lint. The rotating part is the means relied upon for separating the lint from the seed, and to further that end it is not only itself adapted to be rotated but it is also so shaped or contrived as to cause its motion to be communicated to the surrounding body of seed to cause it in turn to rotate or move within the annular space, so that all portions of it are presented to the surface or surfaces of the rotating part and all the different lint-bearing seeds substantially brought directly into contact with the rotating part, to be uniformly and thoroughly treated. That is, the lint-bearing seed, as a body, is carried around in the annular space, but at a slower rate than that at which the rotating part is revolved,—say about one half as fast—and the seed in consequence, is abraded by the rotating part, and at the same time in all parts of the rotating body of seed the seed is stirred and tumbled about and overturned and thereby uniformly treated, and an additional feature of the improved method consists in advancing the seed-roll endwise through the seed receptacle and thereby carrying the seed repeatedly around the rotating part, and subjecting the seed again and again to the abrading, cutting, or tearing action of the rotating part until the seed becomes substantially stripped of its lint, and the lint and denuded seed discharged separately, all as is hereinafter set forth and claimed, aided by the annexed drawings making part of this specification, in which—

Figure 2:
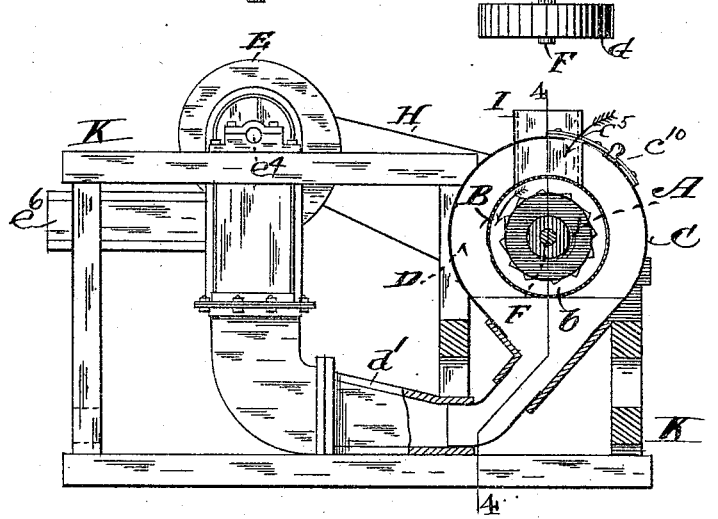
Figure 3:
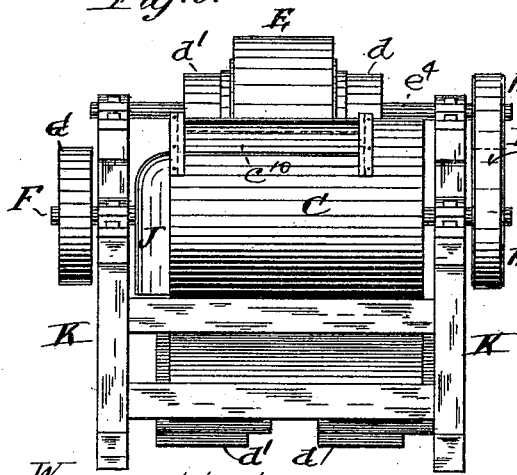
Figure 4:
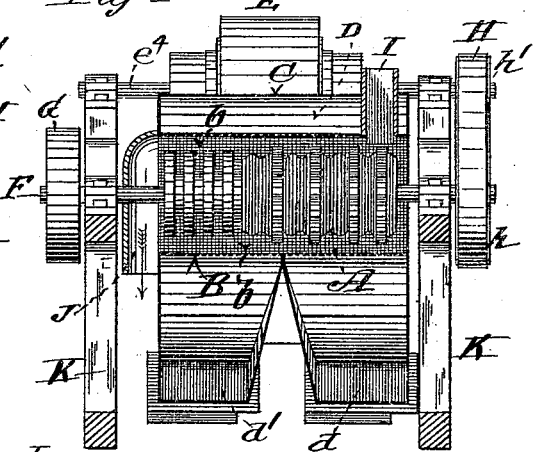

Figure 1 is a plan of the improved delinter, portions of the inner and outer casings which inclose the rotating part, and also a portion of the casing of the air-moving apparatus, being broken away to exhibit the interior; Fig. 2 a side, sectional, elevation of the delinter; Fig. 3 a front end elevation of the delinter; Fig. 4 a vertical transverse section on the line 4—4 of Fig. 2; Fig. 5 a side elevation of the rotating part which effects the separation of the lint from the seed; Fig. 6 a cross section on the line 6—6 of Fig. 5; Fig. 7 a cross section on the line 7—7 of Fig. 5; Fig. 8 a cross section on the line 8—8 of Fig. 5; Fig. 9 a side elevation of the rotating part in a simpler form.

The same letters of reference denote the same parts in all the figures.

A represents the rotating part.

B represents the perforated casing which incloses the annular space $b$ around the rotating part.

C represents an outer casing which incloses a flue, D, which surrounds the casing B. This flue leads to an air-moving apparatus E, and preferably in the form of the two branch-flues, $d$, $d'$, which lead, respectively, from the end portions of the flue D, or casing B, and which respectively connect with the two chambers $e$, $e'$, of the air-moving device. For while a single escape flue and air-moving device will answer to move the lint from the chamber D, I prefer, for a reason presently mentioned, to employ the two separate escape flues and to make the air-moving device a double one, as thereby the lint can be graded and the different grades separately discharged from the delinter. To accomplish this the air moving device is in the form of a pair of fans, $e^2$, $e^3$, attached to the same shaft, $e^4$, but rotating in the separate chambers, $e$, $e'$, respectively, and separate outlets, $e^5$, $e^6$, lead from the chambers $e$, $e'$, respectively, substantially as shown. The rotating part, A, is attached to a suitable shaft, F, and by means of a pulley, G, thereon, power can be transmitted to effect the revolution of the part A at as rapid a rate as may be desired, and by means of the belt, H, leading from another pulley, $h$, upon the shaft F to a pulley $h'$, upon the shaft $e^4$, the rotation of the fan is accomplished.

I represents a suitable inlet through which the lint-bearing seed is introduced into the seed-receptacle $b$, and J represents a suitable outlet for the seed after the lint has been separated therefrom.

A suitable frame work K sustains the described parts of the delinter.

The part A, so far as the general object of the improved delinter is concerned, may be constructed of any suitable material, materials, part or assemblage of parts, and in any suitable shape so long as it, as a whole, is calculated to both move and carry around the body of lint-bearing seed, and to cut, abrade or otherwise separate the lint from the seed, and as one desirable form thereof the part A is composed in portions, if not largely or wholly, of corundum, and in the particular shape shown substantially in Figs. 5 to 8, and as follows: As a whole the part may be considered cylindrical, but beginning at thatend of it which is opposite or next to the inlet to the seed-receptacle and proceeding to or toward the opposite end of the part, the surface of the cylinder is in the form of a series of channels or grooves which encircle the cylinder, and which at various intervals are separated by portions which are serrated, pointed, or shouldered, or otherwise shaped, to catch hold of, stir, lift, and drag around the surrounding body of lint-bearing seed in the manner described.

In the present illustrations $a$, $a'$, $a^2$, $a^3$, $a^4$, $a^5$, $a^6$, $a^7$, $a^8$, represent the grooves, and $a^9$, $a^9$, $a^9$, $a^9$, represent the pointed or shouldered portions, and $a^{10}$, $a^{10}$, $a^{10}$, $a^{10}$ represent circular, disk-like portions which are used more especially in conjunction with the channels or grooves $a^5$, $a^6$, $a^7$, $a^8$, and which, when used, are at that end of the cylinder which is toward the denuded-seed outlet, substantially as shown. The channeled or grooved portions serve more especially to cut, abrade, and separate the lint from the seed. The portions $a^9$, $a^9$, serve as stated to move, lift, and drag the seed. The channeled or grooved portions $a^5$, $a^6$, $a^7$, $a^8$, are considerably deeper than are the other channeled or grooved portions and they serve, in conjunction with the circular portions $a^{10}$, to provide an extended abrading surface past which the nearly-denuded seed is, in the operation of the parts, moved and thereby substantially completely stripped of its lint. They serve therefore to finish the treatment of the seed and I consider them desirable, although the improvement can be largely, if not entirely, carried out by means of a cylinder which does not have them, but which may be constructed substantially as shown in Fig. 9. The channeled or grooved portions $a$, $a'$, &c., preferably have the waved contour shown, and said portions, beginning at the inlet end of the cylinder, successively preferably increase in width substantially as shown, and the shouldered portions are successively arranged farther and farther apart. The points, projections or shoulders, $a^{11}$, of the portions $a^9$, project in practice, radially beyond the adjoining channeled or grooved surfaces, substantially as shown. The entire cylinder, A, may be composed of a series of separate parts, $a$, $a'$, &c., $a^9$, $a^{10}$, assembled and united upon the shaft, F, and connected therewith, to be rotated as a single part. As the portions, $a^9$, serve rather to agitate and drag the seed it is not so essential that they be composed of abrading material or be adapted to cut or abrade the lint. But the capacity of the cylinder A, as a lint-separating device, is increased by adapting the portions $a^9$ to serve also as a lint-separating means.

In operation, the lint-bearing seed is introduced into the seed-receptacle and the abrading cylinder, A, is set in motion. The seed works its way throughout the receptacle and assumes the described annular form around the cylinder. The cylinder acts upon the seed immediately adjacent to it and the separation of the lint from the seed is initiated. At the same time, owing to the described projections upon the cylinder, the body of seed as a whole is caused to rotate within the receptacle and to follow the cylinder in its movement. The cylinder, in respect to that feature of it which enables its motion to be imparted to the body of seed or seed-roll as it may be termed, is provided with projections which while they engage the interior of the roll allow the roll to slip, or travel around at a slower rate than the cylinder, for the reason that they do not take a complete and positive hold of the roll, and also to some extent by reason of the contact of the exterior of the roll against the perforated casing. The preferred distance from the extremities of the projecting portions of the cylinder to the surrounding casing is about seven eighths of an inch. The seed as a body not only travels around within the casing, and by reason of its slower rate of movement is acted upon by the cylinder, but is also in all parts of it stirred and turned to cause the seed throughout the thickness of the roll to be presented to the action of the cylinder. And further, and owing to the horizontal arrangement of the cylinder, the seed, which is by the action of the cylinder lifted or carried into the upper portion of the seed-receptacle, is in position to drop, and by reason of its gravity it does drop onto the cylinder and the seed in consequence is further subjected to the abrading action of the cylinder and in consequence is more thoroughly treated. In thus presenting the lint-bearing seed to the cylinder care must be taken not to crowd it against the surface of the cylinder, as in such case the cylinder is liable not only to remove the lint but also to cut the hulls of the seed something which is quite undesirable, for the value of the entire process depends largely upon separating the lint without any admixture of any part of the seed. For this reason it is necessary for the lint-bearing seed to be presented gently to the cylinder and this is accomplished by having a sufficient thickness of seed-body, substantially as described, around the cylinder as thereby a yielding support is constantly provided for those of the seeds which are for the time being immediately in contact with the cylinder. The roll as stated is preferably introduced into the seed receptacle at one end thereof, and it, as a body, is not only caused to rotate in the manner described but it is also advanced toward the opposite end of the seed receptacle and in this way the seed is repeatedly subjected to the action of the cylinder and thereby given ample opportunity for becoming stripped of its lint. The separated lint is continually being exhausted through the outlets in the casing and the seed escapes through its own outlet at the end of the seed receptacle. The operation is a continuous one as long as the machine is in operation and the lint bearing seed supplied thereto. Air is admitted into the flue D preferably through the opening $c^5$ in the casing C, and the opening can be graduated by means of the slide $c^{10}$. The inlet I is not shown in Fig. 3.

I claim—

1. The herein described method of separating lint from seed which consists in forming the lint-bearing seed into an annular roll and then subjecting such roll internally to a rubbing or cutting action whereby the link is separated from the seed.

2. The herein described method of separating lint from seed which consists in forming the lint-bearing seed into an annular roll, revolving the same on its axis, and, while so moving, subjecting it internally to a rubbing or cutting action, whereby the lint is separated from the seed.

3. The herein described method of separating lint from seed which consists in forming the lint-bearing seed into an annular roll, revolving the same on its axis, and while so moving, subjecting it internally to a rubbing or cutting action, whereby the lint is separated from the seed, and discharging the separated lint at the external surface of the roll.

4. The herein described method of separating lint from seed which consists in forming the lint-bearing seed into an annular roll, revolving the same on its axis, and at the same time stirring the roll, and, while so moving it, subjecting the roll internally to a rubbing or cutting action, whereby the lint is separated from the seed, and discharging the separated lint at the external surface of the roll.

5. In a seed-delinter, the combination of a horizontally-arranged, rotating cylinder and an outer casing, said casing being perforated to provide an outlet for the separated lint and seed, and said cylinder having channeled and shouldered portions to effect the movement of the seed in the form of a roll and the separation of the lint therefrom, substantially as described.

6. In a seed-delinter, the combination of a horizontally-arranged rotating cylinder and an outer-casing, said casing being constructed and arranged to provide for the formation of an annular roll of lint-bearing seed around said cylinder, and being perforated to provide an outlet for the separated lint and seed, and said cylinder having projecting portions to effect the rotation of said roll as described and having cutting or abrading surfaces to effect the separation of the lint from the seed.

7. In a seed-delinter the combination of a horizontally-arranged, rotating cylinder, an annular lint-bearing seed receptacle surrounding said cylinder, a lint-discharge flue without said seed receptacle and an air moving apparatus, said receptacle having an inlet for the lint-bearing seed and an outlet for the denuded seed, and its casing being perforated to provide an outlet for the separated lint, and said cylinder having projecting portions to effect the rotating of said roll as described and having cutting or abrading surfaces to effect the separation of the lint from the seed, substantially as described.

8. In a seed-delinter a horizontally arranged cylinder in combination with a surrounding, annular, seed receptacle, said cylinder having channeled surfaces for effecting the separation of the lint from the seed and having pointed or shouldered portions for effecting the rotation of the lint-bearing seed around said cylinder, said channeled portions being deeper at the seed-delivery end of the cylinder.

Witness my hand this 4th day of February, 1893.

ABNER D. THOMAS.

Witnesses:
 H. H. SCHMUCK,
 A. H. THOMAS.